J. T. PARKS.
Nut-Lock.

No. 209,831.  Patented Nov. 12, 1878.

WITNESSES
Albrecht J. Lerche.
W. C. Jrvolinston.

INVENTOR
John T. Parks,
By Lysander Hill
His Attorney.

N. PETERS, PHOTO-LITHOGRAPHER, WASHINGTON, D. C.

UNITED STATES PATENT OFFICE.

JOHN T. PARKS, OF EFFINGHAM, ILLINOIS.

IMPROVEMENT IN NUT-LOCKS.

Specification forming part of Letters Patent No. 209,831, dated November 12, 1878; application filed March 16, 1876.

*To all whom it may concern:*

Be it known that I, JOHN T. PARKS, of Effingham, in the county of Effingham, and State of Illinois, have invented a new and Improved Nut-Lock; and I do hereby declare the following to be a full and exact description of the same, reference being had to the accompanying drawings, forming part of this specification, in which—

Figure 1:
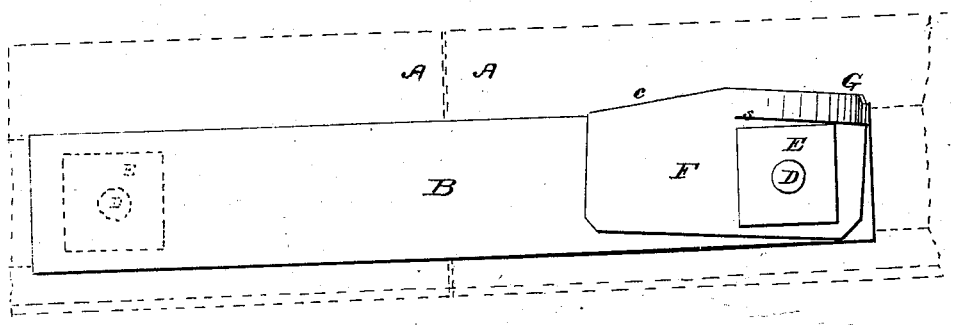
Figure 2:
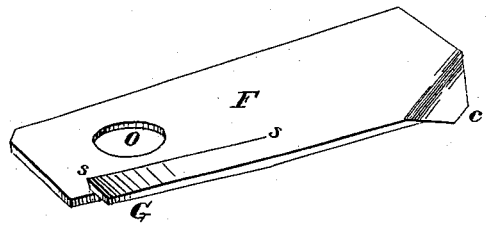

Figure 1 represents my invention applied to an ordinary railroad fish-plate joint, and Fig. 2 is a perspective view of the locking-plate detached.

Similar letters of reference in the several figures indicate the same parts.

My invention has for its object to provide a cheap, simple, and effective device for locking nuts to bolts employed in securing fish-plates to railroad-rail joints; and to this end it consists of a thin plate of metal having a perforation for the passage of the bolt, a spring-lip adapted to bear upon one of the sides of the nut and prevent it from turning, and a turned-down corner to rest upon the edge of the fish-plate and prevent the locking-plate itself from turning, all of which I will now proceed to describe.

In the drawings, A A represent the contiguous ends of two railroad-rails, and B the fish-plate joint applied thereto. D D are the bolts, and E E the nuts. The locking-plate is represented by F. It is provided with a perforation, O, near one end, is slotted longitudinally at $s$ $s$ to form a spring-lip, G, and has a turned-down corner, $c$, as shown.

To apply the locking-plate, it is placed upon the bolt with its turned-down corner resting upon the edge of the fish-plate. The nut is then screwed to its seat, the spring-lip G meanwhile being pressed down to admit of this operation. When the spring-lip is released it rises above the surface of the plate and engages with the proximate side of the nut, thus securely holding the latter in position, and being itself prevented from turning by the turned-down corner $c$, as will be readily understood.

I am aware that metallic washers provided with spring-lips have been before used for locking nuts to bolts in fish-plate joints, the bases or lower edges of the washers resting upon the flanges of the rails to prevent turning, such devices being shown in the patent granted to S. C. Adams June 15, 1869.

I am also aware of the locking-washer described and shown in the patent to Bushong & Fitzpatrick, dated August 1, 1876, which is adapted for operation in connection with a fish-plate of special form. I therefore claim neither of said devices; but

What I claim as my invention is—

The herein-described nut-lock, consisting of the plate F, having the perforation O, spring-lip G, and turned-down corner $c$, applied as set forth.

JOHN T. PARKS.

Witnesses:
- O. R. WILLIAMS,
- ED. R. CONNELLY.